Dec. 16, 1969        M. J. PETERS ET AL        3,483,810
                     FOOD TENDERIZING DEVICE
                     Filed Feb. 27, 1967
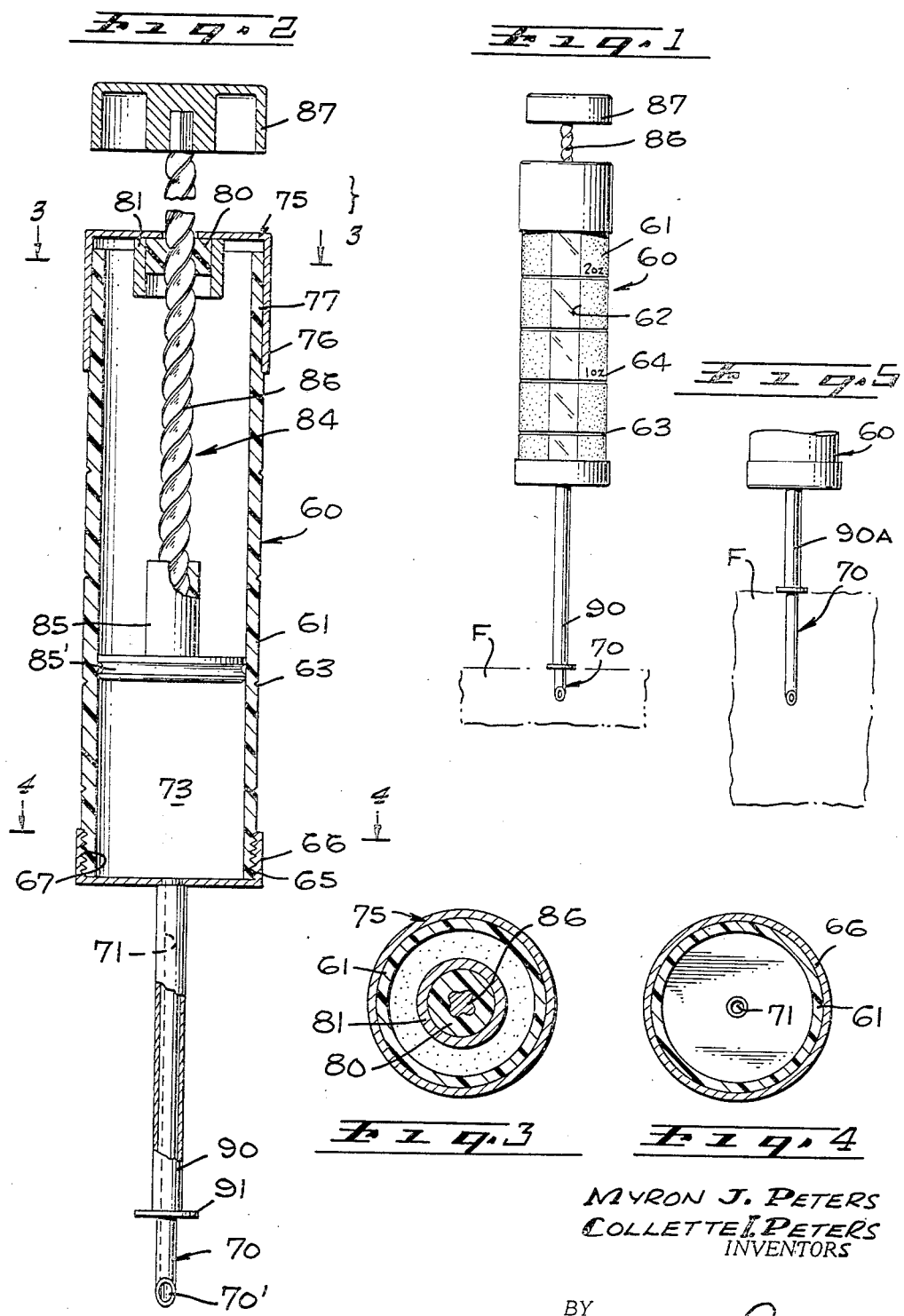
MYRON J. PETERS
COLLETTE I. PETERS
INVENTORS
BY
ATTORNEYS United States Patent Office 3,483,810
Patented Dec. 16, 1969

3,483,810
FOOD TENDERIZING DEVICE
Myron J. Peters and Collette I. Peters, both of 4003 Texas St., San Diego, Calif. 92104
Filed Feb. 27, 1967, Ser. No. 618,948
Int. Cl. A22c 9/00
U.S. Cl. 99—257
2 Claims

ABSTRACT OF THE DISCLOSURE

The application discloses a device having a cylindrical body holding a fluid to be introduced into a food, a hollow probe extending from the body, a plunger in the body to force the fluid through the probe, and means limiting penetration of the probe into the food.

---

This invention has to do with flavoring, tenderizing, or preserving food, such as meat, and more particularly with a device for introducing flavoring, tenderizing or preserving fluid into meat.

Conventionally, seasonings, tenderizers and preservatives in granular or powdered form are sprinkled over food, such as meat, or fluid substances are used, but the substances do not penetrate the food product to produce the desired uniform effect. While the food product is sometimes pierced with a fork, or even pounded, these methods leave much to be desired in the results obtained.

It is therefore an object of the invention to provide a new and improved device which can be readily used to introduce a desired flavoring, tenderizing or preservative fluid into a food, such as meat.

Another object is to provide a device of the type indicated having a hollow probe through which the fluid is injected into the food together with means that can be chosen to regulate the depth of penetration of the probe into the food.

Another object is to provide a device wherein the amount of fluid discharged can be readily ascertained by inspection.

A further object is to provide a device that can be readily disassembled sufficiently for washing.

These and other objects will be apparent from the drawings and the following description. Referring to the drawings:

FIG. 1 is an elevational view of another form of the invention;

FIG. 2 is a sectional elevational view of the device of FIG. 1, but on a larger scale;

FIG. 3 is a cross sectional view on line 3—3 of FIG. 2;

FIG. 4 is a cross sectional view on line 4—4 of FIG. 2; and

FIG. 5 is an elevational view of the lower end of the device, on the same scale as FIG. 1, but showing a different-sized penetration limiting tube.

More particularly describing the invention, reference numeral 60 generally designates a container, which includes a cylindrical body 61 preferably of plastic but which could be made of other material. In the form shown the body is generally opaque except for the transparent window 62 through which the contents can be observed. Gradation lines 63 and suitable indicia 64 are provided to assist the user. The lower end of the body is externally threaded at 65 to receive a metal end cap 66 which is internally threaded at 67. A hollow, open-ended probe 70 is mounted axially of the cap 66 and extends a substantial distance. This has a passage 71 therethrough which is open to the interior space 73 of the body at one end and terminates at its other end at the sharp, beveled cut end 70' of the probe.

The upper end of the container body 61 is closed by a metal cap 75 that has a relatively long cylindrical wall 76 that receives the reduced upper end portion 77 of the body 61. The parts should fit relatively closely so that some effort is required to remove or replace the cap. A nut-like bushing 80 is fixed to the center of cap 75 on the inside thereof, being mounted in a depending retaining wall 81 of the cap.

The device is provided with a plunger 84 for forcing the liquid from the container 60 through the probe 70 into the food F. The plunger includes a piston 85 of plastic having a peripherally grooved disk-like portion 85' in sliding contact with the body. The piston is fixed to the inner end of a threaded rod 86 and the latter is received in and passes through the internally threaded bushing 80 of the cap and carries a handle or knob 87 which is fixed to the outer end of the rod.

It is a feature of the invention that we provide means selectively usable for regulating or limiting the depth of penetration of the probe when forced into the food. This means comprises a sleeve 90 adapted to receive the probe and be readily slid thereon so that its inner end bears against the cap 66 at the bottom of the container. The sleeve terminates at its outer end in an external flange 91 that serves to abut the food and limit penetration of the probe. We provide a set or series of sleeves 90 with each device, the sleeves being of different length, so that a person can choose one to correspond with the amount of penetration desired. A somewhat shorter sleeve 90A is shown in FIG. 9, by way of example.

In using the device, it is first filled or partially filled with the desired fluid, either by drawing up the fluid into the container by an upward stroke of the plunger, or by removing the cap 75 and plunger and pouring the fluid into the top of the container. With the cap and plunger in place it is ready for use. A sleeve 90 of desired length is then chosen and placed on the probe, after which the device is manipulated to force the probe into the food. The handle 87 is then turned to thread the rod inwardly through the nut 80 causing the piston to express fluid through the probe and into the food.

We claim:

1. A device for injecting a tenderizing, flavoring, or other fluid into food, comprising a cylindrical container adapted to hold a supply of the fluid, a piston movable in the container, a probe mounted in the container and having a fluid passage therethrough communicating at its inner end with the interior of the container and terminating at its outer end in an outlet opening, means for operating the piston to force fluid through the probe, and means for adjustably limiting penetration of the probe into the food comprising a plurality of flanged sleeves of different lengths selectively positionable on said probe with the flanged portion of a sleeve adjacent the outer end of the probe.

2. A device for injecting a tenderizing, flavoring, or other fluid into food, comprising a hollow cylindrical container adapted to hold a supply of the fluid, a cap detachably mounted on the outer end of said container and having a nut-like bushing mounted centrally thereof, a piston movable in the container, a threaded rod carrying said piston at its inner end and extending outwardly through said nut-like bushing, a handle on the outer end of said rod, the threads of said rod and bushing being relatively steeply pitched, a closure threadedly mounted at the inner end of said container, a hollow probe mounted in said closure and projecting axially beyond the container, said probe being open to the interior of the container, and means for adjustably limiting penetration of the probe into the food comprising a plurality of flanged sleeves of different lengths selectively positionable on said probe with the flanged portion of a sleeve adjacent the outer end of the probe.

References Cited

UNITED STATES PATENTS

| | | |
|---|---|---|
| 514,378 | 2/1894 | Neal. |
| 860,555 | 7/1907 | Middaugh _____ 128—221 XR |
| 908,219 | 12/1908 | Dressel. |
| 1,192,596 | 7/1916 | Albrecht. |
| 1,630,924 | 5/1927 | Cieslak. |
| 2,290,363 | 7/1942 | Stirton. |
| 2,338,800 | 1/1944 | Burke _____ 128—215 |
| 2,670,673 | 3/1954 | Gordon et al. _____ 99—257 |
| 2,887,035 | 5/1959 | Seversky _____ 99—256 XR |
| 3,082,681 | 3/1963 | Petersen _____ 99—257 |

WILLIAM I. PRICE, Primary Examiner

ARTHUR O. HENDERSON, Assistant Examiner

U.S. Cl. X.R.

128—218